(12) United States Patent
Kim et al.

(10) Patent No.: US 9,747,308 B2
(45) Date of Patent: Aug. 29, 2017

(54) METHOD AND APPARATUS FOR SEARCHING AN IMAGE, AND COMPUTER-READABLE RECORDING MEDIUM FOR EXECUTING THE METHOD

(71) Applicants: Tae-Hoon Kim, Seoul (KR); Minje Park, Seongnam (KR); Songki Choi, Seoul (KR)

(72) Inventors: Tae-Hoon Kim, Seoul (KR); Minje Park, Seongnam (KR); Songki Choi, Seoul (KR)

(73) Assignee: Intel Corporation, Santa Clara, CA (US)

( * ) Notice: Subject to any disclaimer, the term of this patent is extended or adjusted under 35 U.S.C. 154(b) by 687 days.

(21) Appl. No.: 14/343,164

(22) PCT Filed: Nov. 12, 2012

(86) PCT No.: PCT/KR2012/009506
§ 371 (c)(1),
(2) Date: Mar. 6, 2014

(87) PCT Pub. No.: WO2013/073805
PCT Pub. Date: May 23, 2013

(65) Prior Publication Data
US 2014/0201219 A1    Jul. 17, 2014

(30) Foreign Application Priority Data
Nov. 16, 2011    (KR) .......................... 10-2011-0119638

(51) Int. Cl.
*G06F 7/00*    (2006.01)
*G06F 17/30*    (2006.01)
(Continued)

(52) U.S. Cl.
CPC .. *G06F 17/30268* (2013.01); *G06F 17/30247* (2013.01); *G06K 9/72* (2013.01); *G06K 2009/4666* (2013.01)

(58) Field of Classification Search
USPC ......................................... 707/749
See application file for complete search history.

(56) References Cited

U.S. PATENT DOCUMENTS

2006/0285172 A1* 12/2006 Hull .................. G06F 17/30247
358/448
2010/0195914 A1* 8/2010 Isard ................. G06F 17/30247
382/201
2011/0078176 A1* 3/2011 Hayaishi ........... G06F 17/30265
707/769

FOREIGN PATENT DOCUMENTS

KR    10-0267514    11/2000
KR    10-2006-0121801    11/2006

OTHER PUBLICATIONS

PCT Search Report, PCT/KR2012/009506, 1 page, Feb. 28, 2013.
(Continued)

*Primary Examiner* — Muluemebet Gurmu
(74) *Attorney, Agent, or Firm* — Blakely, Sokoloff, Taylor & Zafman LLP

(57) ABSTRACT

The present disclosure relates to a method and apparatus for searching an image, and to a computer-readable recording medium for executing the method. The apparatus for searching an image of the present disclosure obtains features of an input image; and obtains words that correspond to the features respectively and an adjacent word that is adjacent to the words corresponding to the features. When a word is assigned to a first word cell of a plurality of word cells that are included in a visual feature space, an adjacent word is assigned to at least one second word cell that is adjacent to the first word cell, where the plurality of word cells is
(Continued)

assigned to different words, and at least one word being within a predetermined distance from a word is designated as the adjacent word. The apparatus is further configured to search for an image that is identical or similar to the input image based on information associated with a first group of images corresponding to the word and information associated with a second group of images corresponding to the adjacent word, the information on the first and second groups of images being stored in a database.

7 Claims, 9 Drawing Sheets

(51) Int. Cl.
      *G06K 9/72*       (2006.01)
      *G06K 9/46*       (2006.01)

(56) References Cited

OTHER PUBLICATIONS

Sivic, Josef, "Video Google: A Text Retrieval Approach to Object Matching in Videos", IEEE ICCV 2-Volume Set, 1-8 pages, 2003.
Gong, Yunchao, "Iterative Quantization: A Procrestean Approach to Learning Binary Codes", 4 pages, 2011.

\* cited by examiner

FIG. 4

| Index | Image Information | | | |
|---|---|---|---|---|
| A | IM1(f11) IM2(f21) | • | • | • |
| B | IM2(f22) | • | • | • |
| C | IM1(f12) | • | • | • |
| ⋮ | ⋮ | | | |
| H | IM1(f1x) | • | • | • |

FIG. 5

| Index | Image Information |
|---|---|
| 0000 | IM1(f11) IM2(f21)  • • • |
| 0001 | IM2(f22)  • • • |
| 0011 | IM1(f12)  • • • |
| ⋮ | ⋮ |
| 1111 | IM1(f1x)  • • • |

FIG. 7

| Index | Distance | | | |
|---|---|---|---|---|
| | D = 1 | D = 2 | D = 3 | D = 4 |
| A | B ⋯ | C ⋯ | | H ⋯ |
| B | A, C ⋯ | | | |
| ⋮ | ⋮ | ⋮ | ⋮ | ⋮ |
| H | | | | A ⋯ |

METHOD AND APPARATUS FOR SEARCHING AN IMAGE, AND COMPUTER-READABLE RECORDING MEDIUM FOR EXECUTING THE METHOD

The present patent application is a U.S. National Phase Application under 35 U.S.C. 371 of International Application No. PCT/KR2012/009506 filed Nov. 12, 2012, which claims priority from Korean Application No. 10-2011-0119638, filed Nov. 16, 2011, the contents of which are incorporated herein in their entirety by reference.

TECHNICAL FIELD

The present disclosure relates to an image searching method and apparatus, and a non-transitory computer-readable recording medium, for enhancing accuracy of an image search by, when features of an input image correspond to specific words or specific binary codes, searching for an image having a feature identical or similar to the features of the input image not only from first group of images corresponding to the specific words or the specific binary codes in a database, but also from second group of images corresponding to adjacent words or adjacent binary codes, which are adjacent to the first group of images corresponding to the specific words or the specific binary codes.

BACKGROUND

In document searching, a document may be represented as frequencies of words selected from a specific vocabulary. A similarity between documents is measured based on a comparison in terms of this frequency.

Similarly, in image searching, an image is represented as frequencies of visual words selected from a specific visual vocabulary. A similarity between images is measured based on a comparison in terms of this frequency.

By way of example, each of images 1, 2 and 3 has three features, such that the features of image 1 correspond to words "a", "b", "c," respectively, the features of image 2 correspond to words "a", "c", "d," respectively, and the features of image 3 correspond to words "a", "d", "e," respectively. In this case, the similarity frequency between image 1 and image 2 is 2, and the similarity frequency between image 1 and image 3 is 1.

However, unlike a text document, visual words of an image frequently vary subtly due to noise, a photographing angle or the like. That is, a feature that should be represented as the word "a" for example may be represented as the word "e", which is adjacent to the word "a". In this case, at least one image having an identical or similar feature is searched only from the images corresponding to the identification of the word "e" in the database. Thus, there is a problem of the accuracy of the search being decreased.

For example, the technique of searching for an image using visual words, which is disclosed in a paper entitled "Video Google: A Text Retrieval Approach to Object Matching in Videos" published by Josef Sivic and Andrew Zisserman and published in "IEEE International Conference on Computer Vision" in 2003, has the problem described above.

DETAILED DESCRIPTION

Technical Problem

An object of the present disclosure is to solve the above-described problem.

In addition, another objective of the present disclosure is to enhance accuracy of image searching. This objective may be achieved by, when features of an input image correspond respectively to specific words or specific binary codes, searching for an image having a feature identical or similar to the features of the input image, not only from a first group of images corresponding to the specific words or specific binary codes in a database, but also from a second group of images corresponding to words or binary codes that are adjacent to the first group of images.

Technical Solution

The representative configurations of the present disclosure for achieving the above objectives are as follows.

According to one aspect of the present disclosure, an image searching method includes: (a) obtaining, by an image search apparatus, features of an input image; and (b) obtaining, by the image search apparatus, words to which the respective features correspond, and adjacent words that are adjacent to the respective words to which the features correspond. When a first word cell of a plurality of word cells that are included in a visual feature space is assigned to a word, an adjacent word is a word assigned to at least one second word cell of the plurality of word cells, the second word cell being adjacent to the first word cell to which the word is assigned. The plurality of word cells is assigned to different words, and at least one word being within a predetermined distance from the word is designated as the adjacent word. The method further includes (c) searching for, by the image search apparatus, an image that is identical or similar to the input image based on information associated with a first group of images corresponding to the word and information associated with a second group of images corresponding to the adjacent word, the information associated with the first and second groups of images being stored in a database.

According to some other aspects of the present disclosure, there is provided an image searching method, which includes: (a) obtaining, by an image search apparatus, features of an input image; and (b) obtaining, by the image search apparatus, binary codes to which the features correspond, respectively. The method further includes (c) searching for, by the image search apparatus, an image that is identical or similar to the input image based on information associated with a first group of images corresponding to a binary code, and information on a second group of images corresponding to an adjacent binary code that is adjacent to the binary code corresponding to the first group of images and including information on a distance to the binary codes, the information on the first and second groups of images being stored in a database. When a first word cell of a plurality of word cells in a visual feature space is assigned to a binary code, an adjacent binary code is assigned to at least one second word cell of the plurality of word cells, the second word cell being adjacent to the first word cell and including information on a distance to the first word cell. The plurality of word cells may be assigned to different binary codes, and at least one word being within a predetermined distance from the word may be designated as the adjacent word.

According to further aspects of the present disclosure, there is provided an image searching method, which includes: (a) obtaining, by an image search apparatus, features of an input image; (b) obtaining, by the image search apparatus, feature descriptors for the respective features of the input image; and (c) mapping, by the image search apparatus, the feature descriptors of the features of the input image to binary codes. The method further includes (d) searching for, by the image search apparatus, an image that is identical or similar to the input image based on information associated with a first group of images corresponding to a binary code and information on a second group of images corresponding to an adjacent binary code that is adjacent to the binary codes of the first group of images and includes distance information indicating that the adjacent binary code is adjacent to the binary code of the first group of images. The information on the first and second groups of images may be stored in a database. At least one binary code being within a predetermined distance from the binary code may be designated as the adjacent binary code.

According to still further aspects of the present disclosure, there is provided an image search apparatus, which includes: a feature obtaining unit for obtaining features of an input image; and a word and adjacent word obtaining unit for obtaining words to which the features correspond, respectively, and adjacent words that are adjacent to the words. herein When a first word cell of a plurality of word cells that are included in a visual feature space is assigned to a word, an adjacent word is a word assigned to at least one second word cell of the plurality of word cells, the second word cell being adjacent to the first word cell to which the word is assigned. The plurality of word cells is assigned to different words, and at least one word being within a predetermined distance from the word is designated as the adjacent word. The apparatus further includes a search unit for searching for an image that is identical or similar to the input image based on information associated with a first group of images corresponding to the word and information associated with a second group of images corresponding to the adjacent word, the information on the first and second groups of images being stored in a database.

According to still further aspects of the present disclosure, there is provided an image search apparatus, which includes: a feature point obtaining unit for obtaining feature points of an input image; and a binary code obtaining unit for obtaining binary codes to which the respective features correspond. The apparatus further includes a search unit for searching for an image that is identical or similar to the input image based on information associated with a first group of images corresponding to a binary code, and information associated with a second group of images corresponding to an adjacent binary code which is adjacent to the binary code and includes information on a distance to the binary code, the information on the first and second groups of images being stored in a database. When a first word cell of a plurality of word cells in a visual feature space is assigned to a binary code, an adjacent binary code is a code assigned to at least one second word cell of the plurality of word cells, the second word cell being adjacent to the first word cell and including information on a distance to the first word cell. The plurality of word cells is assigned to different binary codes, and, and at least one binary code being within a predetermined distance from the binary code is designated as the adjacent binary code.

According to still further aspects of the present disclosure, there is provided an image search apparatus, which includes: a feature obtaining unit for obtaining features of an input image; a feature descriptor obtaining unit for obtaining feature descriptors for the respective features of the input image; and a feature descriptor-binary code mapping unit for mapping the feature descriptors of the features of the input image to binary codes. The apparatus further includes a search unit for searching for an image that is identical or similar to the input image based on information associated with a first group of images corresponding to a binary code and information associated with a second group of images corresponding to an adjacent binary code, which is adjacent to the binary code, and includes information indicating that the adjacent binary code is adjacent to the binary code. The information on the first and second groups of images may be stored in a database. At least one binary code being within a predetermined distance from the binary code may be designated as the adjacent binary code.

In addition, there is further provided a non-transitory computer-readable recording medium for recording a computer program for executing the above-described methods for implementing the various embodiments of the present disclosure.

Advantageous Effects

According to the present disclosure, when features of an input image respectively correspond to specific words or specific binary codes, an image having a feature that is identical or similar to a feature of the input image is searched, not only from a first group of images associated with the specific words or the specific binary codes in a database, but also from a second group of images associated with an adjacent word or an adjacent binary code that are adjacent to the first group of images associated with the specific words or the specific binary codes. Thus, even if the input image is affected by noise or a photographing angle, it is possible to accurately search the image.

BRIEF DESCRIPTION OF DRAWINGS

FIGS. 2 to 4 are illustrations representing constructions of indexes and image information in a database by a server using images in the database.

FIG. 5 is an illustration of a database structure with indexes and image information in accordance with another embodiment of the present disclosure.

FIG. 7 is an illustration of a word-to-adjacent word lookup table in accordance with an embodiment of the present disclosure.

EMBODIMENTS

Figure 1:
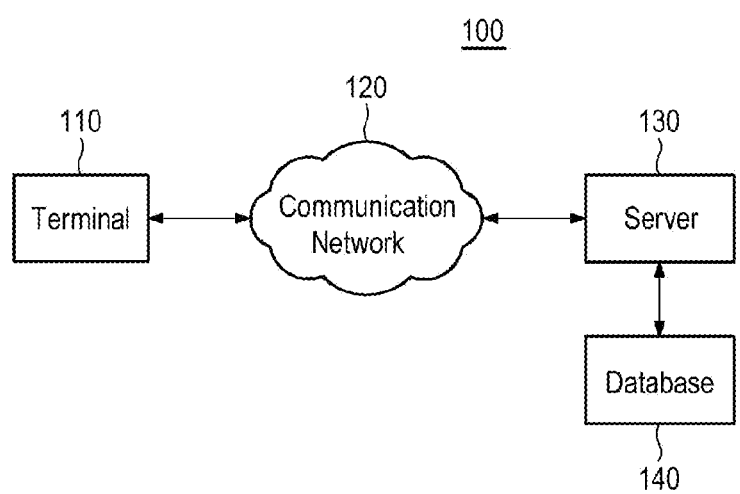
FIG. 1 is a block diagram of an image search system in accordance with an embodiment of the present disclosure.

In the following detailed description of the present disclosure, references are made to the accompanying drawings that show, by way of illustration, specific embodiments in which the present disclosure may be implemented. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined by the appended claims, appropriately interpreted, along with the full range equivalent to what the claims claim. In the drawings, like reference numbers refer to the same as or similar function.

Hereinafter, various embodiments of the present disclosure will be described in detail with reference to the accompanying drawings in order that those skilled in the art can implement the present disclosure easily.

FIG. 1 is a block diagram of an image search system in accordance with an embodiment of the present disclosure.

As shown in FIG. 1, an image search system 100 in accordance with the present disclosure may include a terminal 110, a communication network 120, a server 130 and a database 140

Details of each block shown in FIG. 1 will be described below.

First, the terminal 100 may be a digital device including a function that enables a user to connect to and communicate with the server 130 via the communication network 120, and to input an image for searching. The terminal 110 may be a personal computer (e.g., a desktop computer, a notebook computer, or the like), a workstation, a PDA, a web pad, a cellular phone or the like. In addition, although only one terminal 110 is illustrated in FIG. 1, a plurality of user terminals may be connected via the communication network 120.

In addition, the communication network 120 may employ any communication scheme such as a wired or wireless network. Various communication networks may be employed, such as a local area network (LAN), a metropolitan area network (MAN), and a wide area network (WAN). The communication network 100 referred to herein may also be in communication with a world wide web (WWW).

The database 140 may store a plurality of images therein. The database 140 may separately store indexes for the images and image information on each of the indexed images.

Thus in certain embodiments, the database 140 may store, as the indexes, different one-dimensional words (or one-dimensional numbers) that may not indicate information associated with distances between features. Further, the image information on the images may include, for example, information on features of the images. It may be understood that features of images grouped to a specific one-dimensional word may include associated distance information that they are within a predetermined distance range, while features of images grouped to one-dimensional words other than the specific word may include associated distance information that they have distances greater than the predetermined range.

The one-dimensional words (or one-dimensional numbers), which are stored in the database 140 as indexes, may include associated information on a distance to another word. For example, when the indexes in the database 140 are one-dimensional words, the words that are adjacent in their sequence (e.g., A and B, B and C, and the like) may indicate distance information that they are closer to each other than the words that are not adjacent in their sequence (e.g., A and C, A and D, and the like). Further, when the indexes in the database 140 are one-dimensional numbers, the numbers that are adjacent in their sequence (e.g., 100 and 101, 101 and 102, and the like) may indicate distance information that they are closer to each other than the numbers that are not adjacent in their sequence (e.g., 100 and 102, 101 and 103, and the like).

In accordance with another embodiment, the database 140 may have, as the indexes, binary codes, which include distance information corresponding to a hamming distance. The image information of the images may include, for example, information on features of the images. The features of images being grouped to correspond to a one m-dimensional (bit) binary code may indicate that distances between the features are within a predetermined range. Different m-dimensional binary codes may be used to determine distances within different predetermined distance ranges, each of which covers distances between features that correspond to the respective m-dimensional binary codes.

The server 130 searches for images identical or similar to the input image from a plurality of images in the database 140.

In accordance with an embodiment, the server 130 may extract information on features of each of the plurality of images stored in the database 140. The features of the plurality of respective images may have already been extracted and stored in the database 140. In this case, the server 130 may retrieve the information on the features of the plurality of respective images from the database 140. Also, the server 130 may form clusters (hereinafter, referred to as word cells) by clustering the features of the plurality of images into the clusters of close features based on their positions in a visual feature space (e.g., using a K-means clustering technique). In addition, the server 130 may index the word cells by different one-dimensional words (or numbers) and store image information corresponding to each of the word cells in the database 140. The image information may include an identification symbol and information on features of image included in the respective word cell. At this point, the server 130 may assign the word cells with one-dimensional words (or numbers) that do not indicate distance information, or with the words that indicate information on distances between the word cells. That is, the one-dimensional words (or one-dimensional numbers) stored as the indexes in the database 140 may or may not include distance information. In addition, when the server 130 obtains an input image transmitted from the terminal 110 as a query, the server 130 may detect features of the input image and extract information on the features. In this case, the server 130 may receive the information on the features of the input image from the terminal 110.

Figure 7:
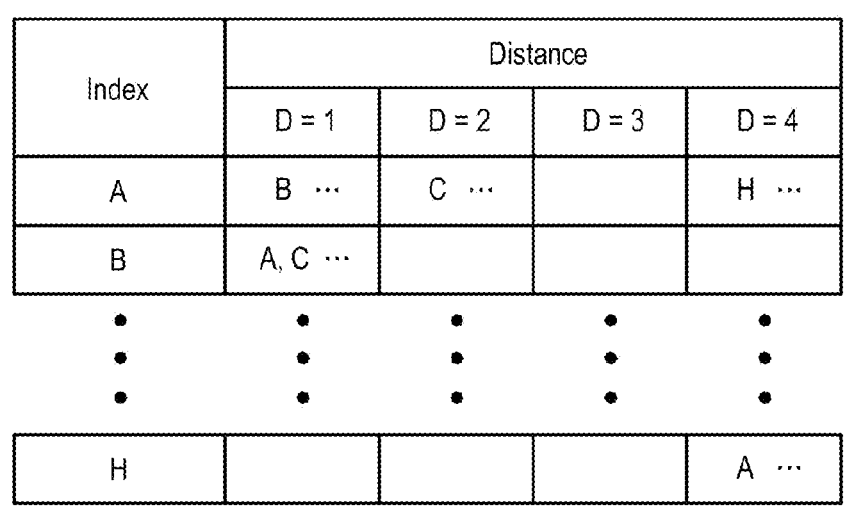

The server 130 may obtain a word to which the features correspond in the visual feature space, and an adjacent word, which is in close proximity to the word that the features correspond to. When the word does not present the distance information, the adjacent word may be obtained using a lookup table as shown in FIG. 7 that will be described later. However, when the word indicates distance information, it may not be necessary to use the lookup table of FIG. 7 to obtain the adjacent word.

The server 130 may search for an image, which includes a feature that is identical or similar to a feature of the input image, from the images in the database 140, which correspond to the word and the adjacent word.

In accordance with another embodiment, the server 130 may detect features of each of the plurality of images stored in the database 140, and extract information on the features. In this case, the features of the plurality of images may have already been extracted and stored in the database 140.

Further, in this case, the server 130 may retrieve information on the features of the plurality of respective images from the database 140. In addition, the server 130 may form the word cells by clustering close features based on the positions of the features of the plurality of images in the visual feature space (e.g., using a K-means clustering technique). The server 130 may store in the database 140, binary codes of different m-dimensions (bits), as indexes, which include information associated with distances between the word cells, and additionally store, as image information, identification symbols and information on the features of the image corresponding to the word cells assigned to the respective binary codes.

In addition, when obtaining the input image transmitted from the terminal 110 as a query, the server 130 may detect features of the input image and extract information on the features. In this case, the server 130 may receive the information on the features of the input image from the terminal 110. The server 130 may search for an image including a feature that is identical or similar to a feature of the input image from the images corresponding to the m-dimensional binary code, to which the feature corresponds in the visual feature space, and the adjacent m-dimensional binary code.

The information associated with the feature may include a feature descriptor, which is represented as an n-dimensional vector. The technique for mapping the feature descriptor represented as an n-dimensional vector to a m-dimensional binary code is disclosed in a paper entitled "Iterative Quantization: A Procrustean Approach to Learning Binary Codes" presented by Yunchao Gong and Svetlana Lazebnik in "conference on computer vision and pattern recognition (CVPR)" in April, 2011. According to this technique, even if the feature descriptors represented as an n-dimensional vector are mapped to the m-dimensional binary codes, the original distance information of the original feature descriptors may be maintained.

This technique may be utilized by the server 130 in another embodiment as described above to map a descriptor of a center point of each word cell (e.g., a descriptor represented as an n-dimensional vector) to an m-dimensional binary code in the conversion into different m-dimensional binary codes that represent information on distances between the word cells.

In accordance with another embodiment, the server 130 may detect features of a plurality of respective images stored in the database 140 and extract information on the features. The features of the plurality of respective images may have already been extracted and stored in the database 140. In this case, the server 130 may retrieve information on the features of the plurality of respective images from the database 140. In addition, the server 130 may map feature descriptors of the plurality of images to different m-dimensional binary codes that include distance information. Among the feature descriptors of the plurality of images, the server 130 may map the feature descriptors that have distances within a predetermined range to one binary code. Accordingly, a plurality of feature descriptors that have distances falling within a plurality of different predetermined ranges may correspond to different binary codes. The server 130 may provide the different m-dimensional binary codes including distance information as indexes and store the image information corresponding to the respective word cells in the database 140. The image information may be an identification symbol and information on features of an image corresponding to the respective word cell.

In another embodiment described above, the server 130 searches through the images with an m-dimensional binary code, which is assigned to the word cell to which the feature is mapped in the visual feature space, and its adjacent m-dimensional binary code. In accordance with still another embodiment, however, the server 130 may directly correspond to a feature of the input image to a m-dimensional binary code and search through the images with the m-dimensional binary code and its adjacent m-dimensional binary code.

In the above-described another and still another embodiments, the m-dimensional binary codes may be codes having information on a distance that is a hamming distance, and "m" may represent an integer smaller than "n." For example, when a feature descriptor is represented using a 128-dimensional vector, a binary code may be 32 bits or 64 bits. However, "m" need not necessarily be an integer smaller than "n." In addition, the distance information may be information on a Euclidean distance.

Figure 2:
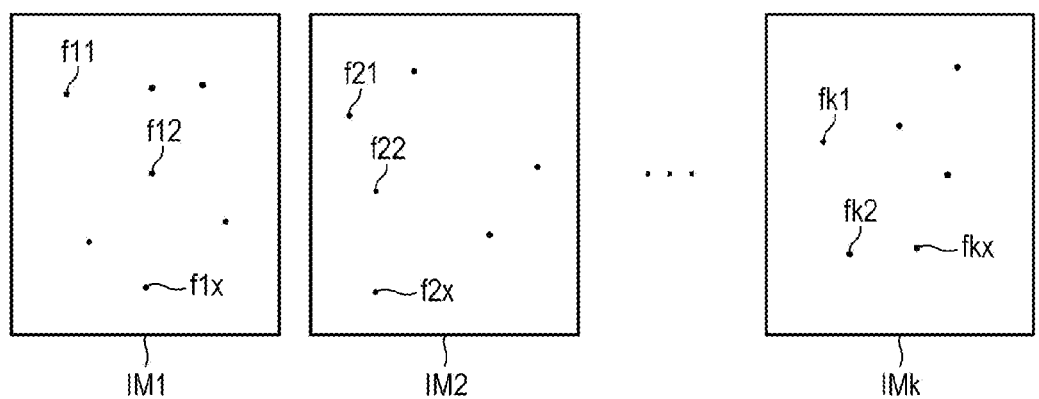
Figure 3:
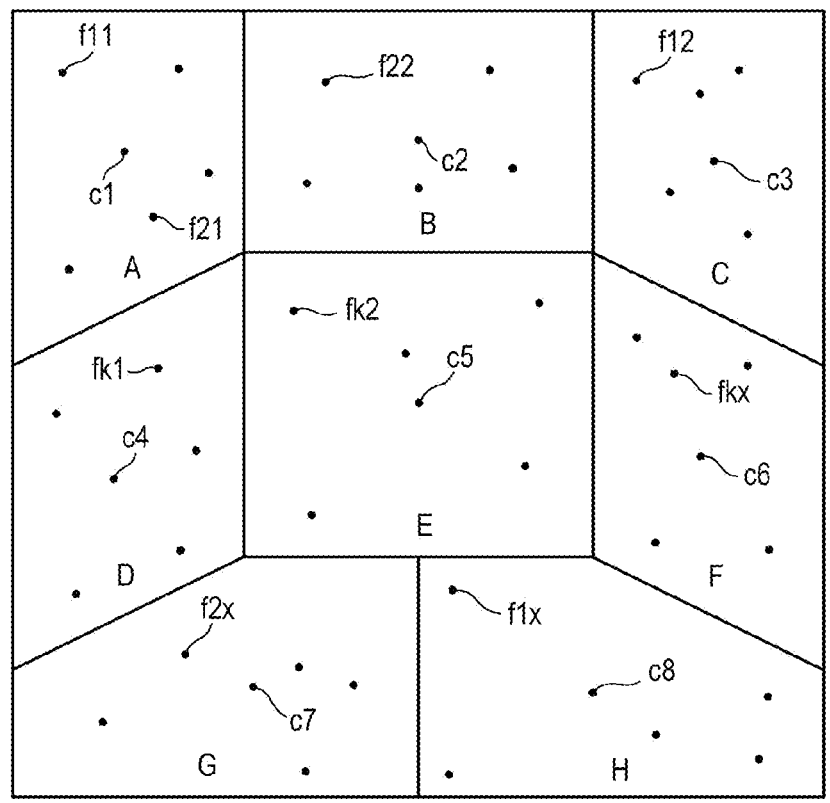

FIGS. 2 to 4 are drawings to illustrate embodiments of the present disclosure that a server constructs indexes and image information in a database by using images in the database.

FIG. 2 illustrates a plurality of images IM1 to IMk stored in the database 140. Reference numerals f11, f12 and f1x may indicate three features among a plurality of features of the image IM1. Reference numerals f21, f22 and f2x may indicate three features among a plurality of features of the image IM2. Reference numerals fk1, fk2 and fkx may indicate three features among a plurality of features of the image IMk.

FIG. 3 shows information on locations of the plurality of features of the plurality of images IM1 to IMk stored in the database 140 in a two-dimensional visual feature space, in which feature descriptors that are represented as n-dimensional vectors are dimensionally reduced to be represented in the two-dimensional visual feature space. Clustering the features of the plurality of images IM1 to IMk (e.g., using a K-means clustering technique) in the two-dimensional visual feature space illustrated in FIG. 3 may form eight word cells, and the eight word cell may be assigned to words A to H. In addition, information on center points c1 to c8 of the eight word cells may be obtained. In the present disclosure, the information on the center point of each word cell may be a descriptor of the center point, and the descriptor of the center point may be a mean value of feature descriptors included in the corresponding word cell.

FIG. 4 illustrates a database having indexes and image information in accordance with an embodiment of the present disclosure. The words A to H may be stored as indexes for the word cells in FIG. 3, respectively. Further, an identification symbol of the image IM1 and a feature descriptor of the feature f11, an identification symbol of the image IM2 and a feature descriptor of the feature f12, and the like, which correspond to the word A in FIG. 3, may be stored as the image information. Further, an identification symbol of the image IM2 and a feature descriptor of the feature point f22, and the like, which correspond to the word B in FIG. 3, may be stored as the image information. Also, the identification symbol of the image IM1 and a feature descriptor of the feature f12, and the like, which correspond to the word C in FIG. 3, may be stored as the image information. In the same way, the database may store an identification symbol of the image IMk and a feature descriptor of the feature fk1, and the like, which correspond to the word D in FIG. 3 and which may be stored as the image information. Also, an identification symbol of the image IMk and a feature descriptor of the feature fk2, and the like, which correspond to the word E, may be stored as the image information. In addition, an identification symbol of the image IMk and a feature descriptor of the feature fkx, and the like, which correspond to the word F, may be stored as the image information. In addition, an identification symbol of the image IM2 and a feature descriptor of the feature f2 k and the like, which correspond to the word G, are stored as the image information. Also, an identification symbol of the image IM1 and a feature descriptor of the feature f1k, and the like, which correspond to the word H, are stored as the image information. In FIG. 4, the identification symbols are represented as IM1, IM2 , . . . , and the feature descriptors are represented as f11, f21, f22, f12, f1 k, . . . , respectively, for convenience.

FIG. 5 is an illustration of a database structure with indexes and image information in accordance with another embodiment of the present disclosure. In this embodiment, four-dimensional (i.e., 4-bit) binary codes including the distance information may be allocated to the one-dimensional words assigned to the word cells as illustrated in FIG. 3 to be stored as the indexes. For example, if a binary code "0000" is allocated to the word cell that is assigned to the word A in FIG. 3, a binary code "0001" may be allocated to the word cell that is assigned to the word B and is adjacent to the word cell assigned to the word A. Further, a binary code "0011" may be allocated to the word cell that is assigned to the word C, and a binary code "1111" may be allocated to the word cell that is assigned to the word H. The binary codes may be codes including information on a hamming distance. Accordingly, the binary codes "0000" and "0001," which have difference of one bit, may indicate that they are the word cells that have a distance difference of 1. Further, the binary codes "0000" and "0011," which have a difference of two bits, may indicate that they are the word cells that have a distance difference of 2. In addition, the binary codes "0000" and "1111," which have a difference of four bits, would indicate that they are the word cells that have a distance difference of 4. As such, the binary code of the word A is different from the binary code of the word B by 1 bit, and the binary code of word B is different from the binary code of word C by 1 bit. Thus, the binary codes include distance information that indicates that the words A and B are adjacent. Also, the binary codes include the distance information that indicates that the words B and C are adjacent.

In addition, in accordance with still another embodiment of the present disclosure, the database illustrated in FIG. 5 may be constructed using the above described technique of mapping the feature descriptors represented as the n-dimensional vectors to the m-dimensional binary codes, without using the visual feature space of FIG. 3.

In constructing the database of FIG. 5, among the m-dimensional binary codes, the binary code that includes unimportant image information, may not be indexed. By way of example, the binary code including unimportant image information may be a code that includes information on a smaller number of features of images compared with other binary codes, but not limited thereto.

Figure 6:
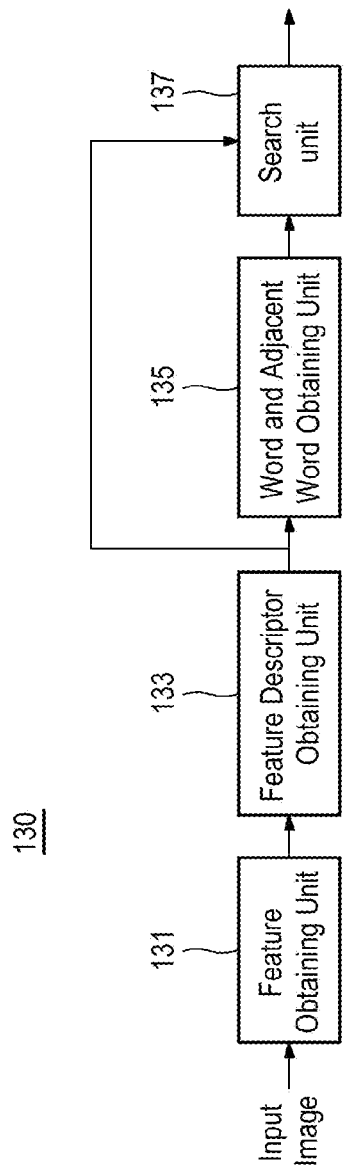
FIG. 6 is a block diagram of a server in accordance with an embodiment of the present disclosure.

FIG. 6 is a block diagram of a server in accordance with an embodiment of the present disclosure. In this embodiment, a server 130 may include a feature obtaining unit 131, a feature descriptor obtaining unit 133, a word and adjacent word obtaining unit 135 and a search unit 137.

A function of each block shown in FIG. 6 will be described below.

The feature obtaining unit 131 may obtain features of an input image. The feature descriptor obtaining unit 133 may obtain a feature descriptor for each of the features. The feature descriptor may be represented as an n-dimensional vector. The word and adjacent word obtaining unit 135 may use the feature descriptor to obtain a word to which the feature corresponds, and an adjacent word. As for obtaining the word to which the feature corresponds, a word that is assigned to the word cell that includes a predetermined feature in the visual feature space of FIG. 3 may be obtained as the word to which the feature corresponds. Alternatively, the word to which the feature corresponds may be obtained by calculating a distance between a predetermined feature and each of the center points c1 to c8 of the word cells, and allocating a word that is assigned to the word cell of which center point has the shortest distance to the predetermined feature to the word to which the feature corresponds. As for obtaining an adjacent word, when a word of a feature descriptor is obtained, a word-to-adjacent word table in accordance with an embodiment illustrated in FIG. 7 may be used to obtain the adjacent word according to the distance differences. The lookup table of FIG. 7 indicates that, in the visual feature space of FIG. 3, the distance difference between the cell assigned to word A and the cell assigned to word B is 1, the distance difference between the cell assigned to word A and the cell assigned to word C is 2, and a distance difference between the cell assigned to word A and the cell assigned to word H is 4. The word and adjacent word obtaining unit 135 may store adjacent words that are adjacent to the respective words in the lookup table, so that an adjacent word may be immediately obtained when a word of a feature of an input image is obtained. However, when the words include distance information, the lookup table of FIG. 7 need not be used to look up the adjacent word.

The search unit 137 may search for an image identical or similar to an input image based on the image information of the words and the adjacent words in the database 140. For example, based on the image information of the words and the adjacent words in the database 140, the search unit 137 may consider distances of a feature descriptor of a feature that obtained by the feature descriptor obtaining unit 133, from the feature descriptors of the features included in the image information of the word and the adjacent word, and assign the feature with an identification symbol that is the same as for the image that includes the feature having the smallest distance. In this manner, the search unit 137 may allocate identification symbols to the features of the input image, and identify at least one image of which identification symbol is the most frequently allocated, as the identical or similar image.

In accordance with the embodiment of FIG. 6, the search unit 137 of the server 130 may search through the database illustrated in FIG. 4 to locate an image that is identical or similar to an input image.

Figure 8:
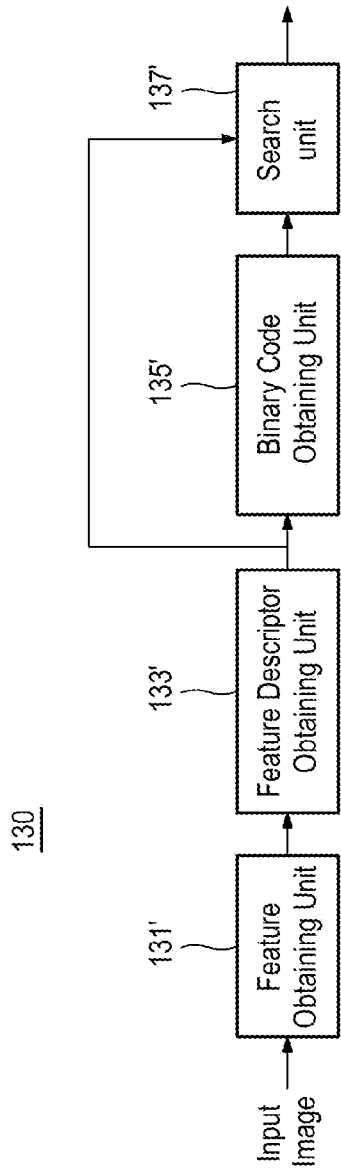
FIG. 8 is a block diagram of a server in accordance with another embodiment of the present disclosure.

FIG. 8 is a block diagram of a server in accordance with another embodiment of the present disclosure. A server 130 may include a feature obtaining unit 131', a feature descriptor obtaining unit 133', a binary code obtaining unit 135' and a search unit 137'.

A function of each block shown in FIG. 8 will be described below.

The feature obtaining unit 131 and the feature descriptor obtaining unit 133' may perform functions identical or similar to those of the feature obtaining unit 131 and the feature descriptor obtaining unit 133 illustrated in FIG. 6. The binary code obtaining unit 135' may obtain a binary code allocated to a word cell to which a feature corresponds in the visual feature space, i.e., a binary code including the distance information. The binary code for the word cell to which the feature corresponds may be obtained by calculating distances of a descriptor of a feature of the input image from the descriptors of the respective center points c1 to c8 of the word cells, and allocating the binary code that is previously assigned to the word cell that includes the center point of which a descriptor has the shortest distance to the descriptor of the feature point of the input image.

The search unit 137' may search for an image identical or similar to the input image based on the image information for the binary code that is extracted by the binary code obtaining unit 135' and its adjacent binary code. The binary codes for indexes in the database 140 may include the distance information. Thus, when a binary code is obtained, the search unit 137' may identify its adjacent binary code. In addition, the search unit 137' may further identify an adjacent binary code that is within a predetermined distance difference by setting the distance difference. If the distance difference is set to 1, the search unit 137' may search for an image identical or similar to the input image based on the image information for one and another binary code that are different from each other by 1 bit. For example, based on the distances between the feature descriptor of a feature, which is obtained by the feature descriptor obtaining unit 133', and the respective feature descriptors of the features included in the image information for the binary code that is obtained by the binary code obtaining unit 135', and its adjacent binary code, the search unit 137' may assign the particular feature with an identification symbol that is the same as that of the image including the feature having the smallest distance. In this manner, the search unit 137' may allocate identification symbols to the features of the input image, and classify at least one image of which identification symbol is the most frequently allocated as the identical or similar image.

In accordance with still another embodiment of FIG. 8, the search unit 137' of the server 130 may search through the database illustrated in FIG. 5 to identify an image identical or similar to the input image.

Figure 9:
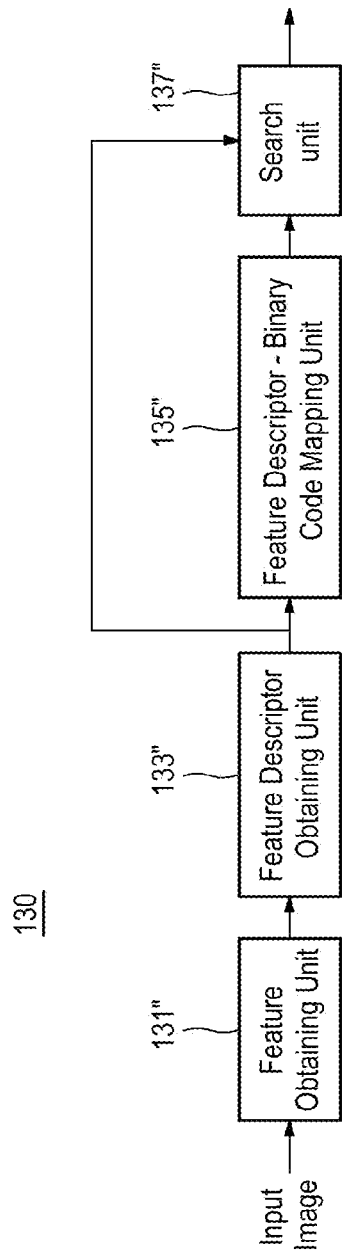
FIG. 9 is a block diagram of a server in accordance with still another embodiment of the present disclosure.

FIG. 9 is a block diagram of a server according in accordance with still another embodiment of the present disclosure. A server 130 may include a feature obtaining unit 131", a feature descriptor obtaining unit 133", a feature descriptor-binary code mapping unit 135" and a search unit 137".

A function of each block shown in FIG. 9 will be described below.

The feature obtaining unit 131" and the feature descriptor obtaining unit 133" may perform functions identical or similar to those of the feature obtaining unit 131 and the feature descriptor obtaining unit 133 of FIG. 6. The feature descriptor-binary code mapping unit 135" may map feature descriptors, which are represented as an n-dimensional vector, into m-dimensional binary codes, while maintaining the information on distances between the features. The feature descriptor-binary code mapping unit 135" may map the feature descriptors to the m-dimensional binary codes using the above described technique disclosed in the CVPR, without forming clusters of features in the visual feature space. This technique may map the feature descriptors, which have distances within a predetermined range, to a corresponding binary code. Details of the function of the search unit 137" are not described herein because it can be easily understood with reference to the above descriptions regarding the search unit 137' of FIG. 8.

Figure 10:
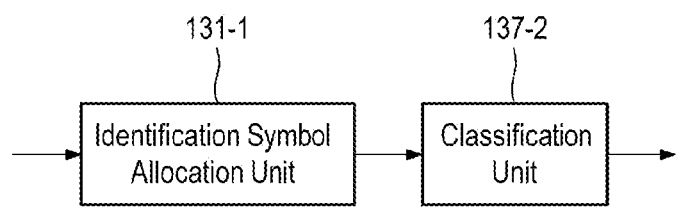
FIG. 10 is a block diagram of a search unit in accordance with an embodiment of the present disclosure.

FIG. 10 is a block diagram of a search unit in accordance with an embodiment of the present disclosure. A search unit 137 may include an identification symbol allocation unit 137-1 and a classification unit 137-2.

A function of each block shown in FIG. 10 is described below.

The identification symbol allocation unit 137-1 may allocate information for at least one of the images that corresponds to a word or an adjacent word, based on the distances between a feature of an input image and respective features of images corresponding to the word and the adjacent word. For example, the identification symbol allocation unit 137-1 may calculate distances between a feature of the input image and respective features of images corresponding to a word and an adjacent word, and allocate an identification symbol of the image that corresponds to the word and the adjacent word and includes the feature having the shortest distance to the feature of the input image.

The classification unit 137-2 may identify an image identical or similar to the input image based on the identification symbols of images, which are allocated to the respective features of the input image. For example, the classification unit 137-2 may examine the identification symbols of images allocated to the respective features of the input image, and identify an image of which identification symbol is the most frequently allocated as the image identical or similar to an input image.

The search unit 137 of FIG. 10 may be implemented not only in one of embodiments of the search unit of FIG. 6, but also in one of embodiments of the search units 137' and 137" in FIGS. 8 and 9, respectively.

It has been described in the above embodiments that an input image may be transmitted as a query from the terminal 110 and the server 130 may obtain the input image and execute the image search. However, the terminal 110 may detect a feature of the input image, extract information on the feature and transmit it to the server 130. Further, the terminal 110 may obtain the word to which the feature corresponds, and the adjacent word adjacent, which is in close proximity to the word, and transmit those words to the server 130.

In addition, when the terminal 110 downloads and stores therein some of the images in the database 140, the terminal may perform the image search. That is, the terminal may input an input image by itself and be provided with the configurations illustrated in FIGS. 6 to 10 to perform the same image search operation as that of the server 130.

According to the present disclosure, a Hessian Affine detector may be used to detect features. Further, a scale invariant feature transform (SIFT) algorithm may be used to extract feature descriptors. In addition, a variety of well-known techniques for detecting features and extracting point descriptors may be applied in the present disclosure.

The embodiments according to the present disclosure described above can be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present disclosure or a program command known to be used by those skilled in the art of the computer software field. The computer-readable recording medium includes, for example, a magnetic medium, such as a hard disk, a floppy disk and a magnetic tape, an optical recording medium, such as a CD-ROM and a DVD, a magneto-optical medium, such as a floptical disk, and a hardware device specially configured to store and execute program commands, such as a ROM, a RAM, a flash memory and the like.

The program command includes, for example, a high-level language code that can be executed by a computer using an interpreter or the like, as well as a machine code generated by a compiler. The hardware devices can be configured to operate using one or more software modules in order to perform the processing according to the present disclosure, and vice versa.

In the foregoing discussion, although the present disclosure has been described in connection with the specific matters, such as the specific components, the various embodiments and the drawings, they are provided only for assisting in the understanding of the present disclosure, and the present disclosure is not limited to these embodiments. It will be apparent that those skilled in the art can make various modifications and changes thereto from these descriptions.

Therefore, the spirit of the present disclosure should not be limited to the above embodiments, and the appended claims and what are modified equally or equivalently thereto will be considered to fall within the scopes of the present disclosure.

The invention claimed is:

1. An image searching method, comprising:
   (a) obtaining, by an image search apparatus, feature descriptors of an input image;
   (b) obtaining, by the image search apparatus, words to which the respective features correspond, and adjacent words that are adjacent to the respective words to which the features correspond, wherein when a first word cell of a plurality of word cells that are included in a visual feature space is assigned to a word, an adjacent word is a word assigned to at least one second word cell of the plurality of word cells, the second word cell being adjacent to the first word cell to which the word is assigned, wherein the plurality of word cells is assigned to different words, and at least one word being within a predetermined distance from the word is designated as the adjacent word, wherein the plurality of word cells in the visual feature space is formed by obtaining features of a plurality of respective images stored in the database, and clustering the features of the plurality of images based on the locations in the visual feature space, and the plurality of word cells is assigned to different words, and further wherein at least one of the words is obtained by using information on center points, each of which is a mean value of features of images that correspond to the respective word cell, to compare distances between the respective features of the input image and the respective center points of the plurality of word cells, and obtaining, for the word, a word assigned to a word cell of which center point is most closely adjacent to the corresponding feature of the input image;
   (c) searching for, by the image search apparatus, an image that is identical or similar to the input image based on information associated with a first group of images corresponding to the word and information associated with a second group of images corresponding to the adjacent word, the information on the first and second groups of images being stored in a database, wherein the information on the first group of images corresponding to the word includes identification symbols and feature descriptors of the respective first group of images corresponding to the first word cell to which the word is assigned from among the plurality of word cells in the visual feature space, and the information on the second group of images corresponding to the adjacent word includes identification symbols and feature descriptors of the respective second group of images corresponding to at least one second word cell adjacent to the first word cell to which the word is assigned from among the plurality of word cells in the visual feature space.

2. The method of claim 1, wherein the distance information is information on a Euclidian distance.

3. The method of claim 1, wherein step (c) comprises:
   allocating an identification symbol of at least one image of the first and second groups of images to each of the features of the input image based on distances of the respective feature of the input image from the respective features of the first and second groups of images; and
   identifying an image that is identical or similar to the input image based on the identification symbols allocated to the respective features of the input image.

4. An image search apparatus, comprising:
   a processor to:
   obtain features of an input image;
   obtain words to which the respective features correspond, and adjacent words that are adjacent to the words, wherein when a first word cell of a plurality of word cells that are included in a visual feature space is assigned to a word, an adjacent word is a word assigned to at least one second word cell of the plurality of word cells, the second word cell being adjacent to the first word cell to which the word is assigned, and the plurality of word cells being assigned to different words, and at least one word being within a predetermined distance from the word is designated as the adjacent word, wherein the plurality of word cells in the visual feature space is formed by obtaining features of a plurality of respective images stored in the database, and clustering the features of the plurality of images based on the locations in the visual feature space, and the plurality of word cells is assigned to different words, and further wherein at least one of the words is obtained by using information on center points, each of which is a mean value of features of images that correspond to the respective word cell, to compare distances between the respective features of the input image and the respective center points of the plurality of word cells, and obtaining, for the word, a word assigned to a word cell of which center point is most closely adjacent to the corresponding feature of the input image; and
   search for an image that is identical or similar to the input image based on information associated with a first group of images corresponding to the word and information associated with a second group of images corresponding to the adjacent word, the information on the first and second groups of images being stored in a database, wherein the information on the first group of images corresponding to the word includes identification symbols and feature descriptors of the respective first group of images corresponding to the first word cell to which the word is assigned from among the plurality of word cells in the visual feature space, and the information on the second group of images corresponding to the adjacent word includes identification symbols and feature descriptors of the respective second group of images corresponding to at least one second word cell adjacent to the first word cell to which the word is assigned from among the plurality of word cells in the visual feature space.

5. The apparatus of claim 4, further comprising a lookup table including information on the adjacent words mapped to the words in the visual feature space.

6. The apparatus of claim 4, wherein the processor further to:
- allocate an identification symbol of at least one image of the first group of images and the second group of images to each of the features of the input image based on distances of the respective feature of the input image to the respective features of the first and second groups of images; and
- identify an image that is identical or similar to the input image based on the identification symbols allocated to the respective features of the input image.

7. A non-transitory computer-readable recording medium for recording a computer program comprising instructions, which when executed by a processor, causes the processor to perform operations comprising:
- (a) obtaining, by an image search apparatus, features of an input image;
- (b) obtaining, by the image search apparatus, words to which the respective features correspond, and adjacent words that are adjacent to the respective words to which the features correspond, wherein when a first word cell of a plurality of word cells that are included in a visual feature space is assigned to a word, an adjacent word is a word assigned to at least one second word cell of the plurality of word cells, the second word cell being adjacent to the first word cell to which the word is assigned, wherein the plurality of word cells is assigned to different words, and at least one word being within a predetermined distance from the word is designated as the adjacent word, wherein the plurality of word cells in the visual feature space is formed by obtaining features of a plurality of respective images stored in the database, and clustering the features of the plurality of images based on the locations in the visual feature space, and the plurality of word cells is assigned to different words, and further wherein at least one of the words is obtained by using information on center points, each of which is a mean value of features of images that correspond to the respective word cell, to compare distances between the respective features of the input image and the respective center points of the plurality of word cells, and obtaining, for the word, a word assigned to a word cell of which center point is most closely adjacent to the corresponding feature of the input image;
- (c) searching for, by the image search apparatus, an image that is identical or similar to the input image based on information associated with a first group of images corresponding to the word and information associated with a second group of images corresponding to the adjacent word, the information on the first and second groups of images being stored in a database, wherein the information on the first group of images corresponding to the word includes identification symbols and feature descriptors of the respective first group of images corresponding to the first word cell to which the word is assigned from among the plurality of word cells in the visual feature space, and the information on the second group of images corresponding to the adjacent word includes identification symbols and feature descriptors of the respective second group of images corresponding to at least one second word cell adjacent to the first word cell to which the word is assigned from among the plurality of word cells in the visual feature space.

* * * * *